United States Patent [19]

Lima-Marques et al.

[11] Patent Number: 5,800,600
[45] Date of Patent: Sep. 1, 1998

[54] SOLID INK JET INK

[75] Inventors: Luis Lima-Marques, Blackwood; Stephen Lansell Nicholls, Willunga; Terence Michael Lawson, Aldgate, all of Australia

[73] Assignee: Tonejet Corporation Pty Ltd, Eastwood, Australia

[21] Appl. No.: 750,831

[22] PCT Filed: Jul. 11, 1995

[86] PCT No.: PCT/AU95/00419
§ 371 Date: Dec. 19, 1996
§ 102(e) Date: Dec. 19, 1996

[87] PCT Pub. No.: WO96/02598
PCT Pub. Date: Feb. 1, 1996

[30] Foreign Application Priority Data

Jul. 14, 1994 [AU] Australia .................. PM6804

[51] Int. Cl.$^6$ .................................................. C09D 11/00
[52] U.S. Cl. ....................... 106/31.29; 106/31.32; 106/31.35; 106/31.41; 106/31.61; 106/31.62; 106/31.67; 106/31.73
[58] Field of Search ..................... 106/31.29, 31.61, 106/31.32, 31.62, 31.35, 31.67, 31.41, 31.73

[56] References Cited

U.S. PATENT DOCUMENTS

| | | |
|---|---|---|
| 3,653,932 | 4/1972 | Berry et al. . |
| 4,684,956 | 8/1987 | Ball .................................. 106/31 |
| 4,741,930 | 5/1988 | Howard et al. . |
| 4,820,346 | 4/1989 | Nowak . |
| 4,878,946 | 11/1989 | Tabayashi et al. . |
| 5,221,335 | 6/1993 | Williams et al. . |
| 5,235,932 | 8/1993 | Reich ................................ 114/322 |
| 5,286,288 | 2/1994 | Tobias et al. ....................... 106/31 |
| 5,624,483 | 4/1997 | Fujioka ............................ 106/31.3 |

FOREIGN PATENT DOCUMENTS

| | | |
|---|---|---|
| 0 506 395 | 9/1992 | European Pat. Off. . |
| 94/18011 | 8/1994 | WIPO . |
| 94/20579 | 9/1994 | WIPO . |

OTHER PUBLICATIONS

Derwent Abstract of Japanese Patent Document JA] 102970 dated Mar. 20, 1978.

*Primary Examiner*—Deborah Jones
*Attorney, Agent, or Firm*—Evenson, McKeown, Edwards & Lenahan P.L.L.C.

[57] ABSTRACT

A solid ink jet ink composition which is suitable for hot melt applications having a carrier having an electrical resistivity of at least $10^8$ Ohm.cm, insoluble marking particles and a particle charging agent dispersed in it. The marking particle may be a pigment, an insoluble dyestuff, a polymer or mixture thereof. The particle charging agent may be a metal soap, a fatty acid, lecithin, an organic phosphorous compound, a succinimide, a sulphosuccinate, petroleum sulphonates, a soluble or partially soluble resin such as a modified rosin ester, an acrylic, a vinyl a hydrocarbon or a mixture thereof. The solid ink jet ink composition may further include a viscosity controller. The ink may be capable of being heated to 155° C. and have at that temperature a viscosity of between 5 to 150 cps.

19 Claims, No Drawings

SOLID INK JET INK

FIELD OF THE INVENTION

This invention relates to inks and more particularly to inks which are solid at room temperature and suitable for use in ink jet printing apparatus.

BACKGROUND OF THE INVENTION

Inks are generally a carrier liquid with a dye dissolved in them. Inks are also known which comprise a carrier liquid and particles dispersed in the ink. The actual composition of machine inks as distinct from writing inks is determined by the type of application method for such inks.

There are two types of ink jet application techniques in use today. The first of these is known as continuous ink jet and the second is impulse ink jet.

In continuous ink jet systems, droplets of ink are produced as a result of hydrostatic pressure on a liquid ink forcing the ink through a nozzle. The nozzle can be stimulated, such as by piezo-electric vibration to cause the droplets to be ejected on a regular basis. At the point of formation, the droplets may be inductively charged and subsequently pass through electrodes which provide a constant electrostatic field causing these droplets to be deflected. Therefore the required droplets are controlled to a substrate and unwanted ones are removed. Due to the charging requirements it is necessary that the ink be conductive. Such an ink may be water or solvent based and the colorant may be a pigment or soluble dye.

In the impulse ink jet system, droplets are produced only as required by the generation of a pressure disturbance within the ink adjacent to a jet nozzle. The application of pressure may be by stimulation caused by a piezo-electric crystal or by thermal stimulation where a micro bubble is created by an electrically resistive heater. Typical inks are water based and use a dye for the colorant though the use of solvents and pigments are not precluded from this process. As there is no need for droplet charging there is no specific requirement concerning conductivity of the ink.

A further embodiment of the impulse system is hot melt ink jet technology. This process is similar to the piezo-electric drop on demand except that the ink is solid at room temperature but is maintained at an elevated temperature in the print head such that it is a liquid under operating conditions. Again therefore, there is no need for the ink's conductivity to be suited to some equipment performance standard.

An example of a hot melt ink is given in U.S. Pat. No. 3,653,350 in the name of Berry and assigned to Teletype. This patent disclosure involves a hot melt ink that comprises a dye dissolved in diesters of sebacic ester. The resultant inks are somewhat insulative as they have resistivities in the range of $10^8$ to $10^{11}$ Ohm.cm. They do not contain particulate materials and more importantly do not contain chemical agents to specifically modify the charge characteristics of the ink. Therefore, the controlled flight of these ink droplets is accomplished by applying a very substantial 10,000 volts to a backing plate located behind a paper substrate.

Another example of a hot melt ink is given in U.S. Pat. No. 5,235,932 in the name of Lin and assigned to Dataproducts. This patent disclosure involves a hot melt ink which includes a conductive pigment that produces a volume resistivity in the range of $10^2$ to $10^4$ Ohm.cm.

Another example of a hot melt ink is given in U.S. Pat. No. 5,286,288 in the name of Tobias and assigned to General Electric Co. The hot melt ink of this patent disclosure is designed to be conductive so that it is suited for use with continuous ink jet technology. the conductivity must be greater than 100 microsiemens/cm which is equivalent to a volume resistivity of no more than $10^4$ Ohm.cm.

Yet another example of a hot melt ink is given in U.S. Pat. No. 4,684,956 in the name of Ball and assigned to Willet. The prime thrust of this patent disclosure concerns a formulation of thermally stable hot melt ink that is used in drop on demand ink jet operation. It is also stated that it is necessary for the composition to be able to accept an electric charge and this is achieved by the incorporation of a more ionic or polar material with the aid of a wetting agent. The purpose of this is to convert the ink to function with continuous ink jet technology by increasing its conductivity to at least 1000 microsiemens/cm which is equivalent to a volume resistivity of no more than $10^3$ Ohm.cm.

Electrostatic ink jet is a further technology which is characterised by droplets being drawn from an orifice under the influence of an electrostatic field. This field acting between a valving electrode and the orifice, attracts free charges within the ink to its surface such that a droplet is produced when the electrostatic pull exceeds the surface tension of the ink. As this technique relies on attraction of free charges, it therefore requires that the ink be conductive.

Here the concept of accepting an electric charge relates specifically to the requirements of continuous ink jet printing. The technology involves the ejection from a nozzle of a stream of ink which breaks up into droplets with the aid of a piezoelectric vibrator within the nozzle. At the point where the ink stream breaks down to droplets it is passed through a pair of electrodes which cause inductive charging of the droplets. This only happens if the ink is sufficiently conductive to allow the passage of a counter charge back through the ink stream and down to earth. Therefore in this case, the charging is accomplished by an applied electric field which leads to the total ink droplet attaining a charge.

A final system that utilises small electromechanical valves to produce droplets is known as the valve jet process. This is in essence a micro spray gun system and produces much larger droplets than the true ink jet technologies. As the droplets are produced mechanically there is no requirement concerning the conductivity of the ink.

The preceding technologies may be limited in terms of achievable resolution due to droplet formation being a function of the jet nozzle diameter. The smallest nozzles used have diameter in the range of 7.5 to 10 micrometers which produce droplets of the order of 14 to 20 micrometers and this translates to a dot size of 30 to 40 micrometers on selected papers. Further, the inks used in these small nozzle jet printers are based on water soluble dyes, as pigment based inks cause problems with nozzle blocking. Therefore the advantages of pigment formulations, namely better water-fastness and light-fastness as well as a broader range of available colours, are precluded.

A new ink jet printing technology has been described in the patent application U.S. Ser. No. 08/492,112. This process provides a means of producing variable sized droplets that contain a high concentration of particulate material from an ink which is liquid when present on or near the ejection location but is a solid or highly viscous liquid at room temperature. Specific advantages conveyed by this process include the ability to form droplets as small as a few micrometers while still using pigments as the colorant material. This is because the size of the droplets are controlled primarily by the voltage on an ejection location and the viscosity of the ink during ejection, not by the size of an ink jet nozzle. Therefore high resolution and high density images based on light and water resistant pigments can be produced.

SUMMARY OF THE INVENTION

This present invention is in relation to an ink that can be used with the new ink jet printing technology outlined above where the ejected droplets formed are substantially solid colorant and comprise a small amount of a carrier. Specifically the ink contains a carrier which is a solid or highly viscous liquid at room temperature but at some point within the ink jet head the viscosity of said carrier is reduced by the application of heat radiation such that the ink can move to the ejection location and be ejected as discrete droplets. In addition the ink contains particle charging agents which impart charge to the marking particles dispersed within said carrier. The various inks discussed in the prior art cannot produce droplets in the device disclosed due to the absence of a suitable particle charging agent to charge the marking particles dispersed in such a carrier.

The said ink also has properties that are readily utilised for the production of high resolution marking. This results in part from the intrinsically small droplets produced by the jet printer and a reduced tendency for wicking and bleeding due to the low concentration of carrier within the printed droplets.

It is an object of this invention to produce a solid ink jet ink which can give a high intensity mark or at least to provide an alternative ink for ink jet printing.

A further object of the invention is to produce a solid ink jet ink for high resolution marking.

It is yet another object to provide a solid ink jet ink that has a minimal tendency to wick or bleed.

In one form therefore the invention is said to reside in a solid ink jet ink composition comprising a carrier having an electrical resistivity of at least $10^8$ Ohm.cm, insoluble marking particles and a particle charging agent dispersed therein wherein said marking particles are capable of being agglomerated and ejected from the bulk ink as discrete droplets in the presence of a non-uniform electrostatic field of significant gradient when the viscosity of the ink is reduced.

The reduction in viscosity may be done by heating and subsequent melting of the ink. The bulk ink may be heated to provide a mass of melted ink or just a small amount of ink may be heated at an ejection location.

Even after the addition of the various components to the carrier the resultant ink still has an electrical resistivity of at least $10^8$ Ohm.cm or to put it another way a conductivity of 0.01 microsiemens (μS).

The carrier may be a low melting point wax or resin such as low molecular weight polyethylene, hydrogenated castor oil, ester wax, paraffin wax, rosins, and ethylene vinyl acetate copolymers or mixtures thereof.

The marking particle may be a pigment, an insoluble dyestuff, a polymer or mixture thereof.

The particle charging agent is a metal soap, a fatty acid, lecithin, an organic phosphorus compound, a succinimide, a sulphosuccinate, petroleum sulphonates, or a mixture thereof.

Alternatively the particle charging agent is a soluble or partially soluble resin such as a modified rosin ester, an acrylic, a vinyl, a hydrocarbon or a mixture thereof.

The ink may be capable of being heated to 155° C. and have a viscosity in the range of 5 to 150 cps.

In an alternative form the invention may be said to reside in a solid ink jet ink composition comprising a carrier having an electrical resistivity of at least $10^8$ Ohm.cm, insoluble marking particles and a particle charging agent, wherein the ink has a viscosity in the range of 5 to 150 cps at 155° C. and the particle charging agent is selected from the group comprising metal soaps, fatty acids, lecithin, organic phosphorus compounds, succinimides, sulphosuccinates, petroleum sulphonates, soluble or partially soluble resins such as a modified rosin esters, acrylic esters, vinyl esters or mixtures thereof.

In an alternative form the invention may be said to reside in a solid ink jet ink composition comprising a carrier having an electrical resistivity of at least $10^8$ Ohm.cm, insoluble marking particles and a particle charging agent, where the ink is capable of being heated to 135° C. and has a viscosity in the range 20 to 50 cps at that temperature and the particle charging agent is selected from the group comprising metal soaps, fatty acids, lecithin, organic phosphorus compounds, succinimides, sulphosuccinates, petroleum sulphonates, soluble or partially soluble resins such as a modified rosin esters, acrylic esters, vinyl esters or mixtures thereof.

In an alternative form the invention may be said to reside in a solid ink jet ink comprising;
(a) 80 to 98.9% of a carrier having an electrical resistivity of at least $10^8$ Ohm.cm and which is solid at room temperature and which has a viscosity in the range of 5 to 150 cps at 155° C.,
(b) 1 to 10% of insoluble marking particles, and
(c) 0.1 to 5% of a particle charging agent.

In a further alternative form the invention may be said to reside in a solid ink jet ink comprising;
(a) 80 to 98.9% of a carrier which is solid at room temperature and which has a viscosity in the range of 5 to 150 cps at 155° C.,
(b) 1 to 10% of insoluble marking particles, and
(c) 0.1 to 5% of a particle charging agent, the resultant ink having an electrical resistivity of at least $10^8$ Ohm.cm.

DESCRIPTION OF PREFERRED EMBODIMENTS

The present invention provides for an ink that comprises marking particles that are dispersed in a carrier such that it has an electrical resistivity of at least $10^8$ Ohm.cm. In addition the ink contains particle charging agents, such agents being essential to the performance of said ink, thus rendering said ink unique. The resultant ink also has an electrical resistivity of at least $10^8$ Ohm.cm.

The ink may be composed of a carrier which may be a low melting point wax or resin combined with a pigment phase. The wax or resin may be low molecular weight polyethylene, hydrogenated castor oil, ester wax, paraffin wax, rosins, and ethylene vinyl acetate copolymers or mixtures thereof.

Marking particles that are insoluble in the carrier may be selected upon their particular proposed end use and may be made from a wide range of colorants and polymers or mixtures thereof. Examples of colorants suitable for use in the ink are organic pigments such as pigment yellow 1, pigment yellow 14, pigment red 48:2, pigment red 122, pigment blue 15:3 and pigment blue 56; inorganic pigments such as pigment white 6, pigment yellow 35, pigment blue 27, pigment black 7 and pigment black 11; solvent dyes such as solvent red 7, solvent yellow 88, solvent blue 49, basic red 1 and basic blue 26 and metallic pigments such pigment metal 1 and pigment metal 2.

Polymers, suitable for use in the ink as particles are epoxy resins such as bisphenol A epoxy, novolac epoxy and cycloaliphatic epoxy; acrylic resins such as polymers and copolymers of acrylic acid and esters thereof, polymers and copolymers of methacrylic acid and esters thereof; vinyl resins such as polymers and copolymers including vinyl acetate, vinyl chloride, vinyl alcohol and vinyl butyral; alkyd resins such as oil, phenolic and rosin modified alkyds and finally modified rosin esters such as dimerised pentaerythritol rosin ester. These polymers may be dyed or include pigments dispersed therewith. The polymer selected should be a material that is thermally stable at the selected operating temperature for the ink.

In addition, resins and polymers that are soluble or partially soluble are used to disperse the marking particles in the carrier and to function as a binder for said marking particles to a substrate. Examples of suitable resins include certain modified rosin esters, acrylic resins and vinyl resins that are similar to those listed above except that these have larger alkyl groups which impart the carrier solubility. In addition hydrocarbon resins such as alpha methyl styrene and polyisobutylene are also suitable.

The particle charging agent may be any material that is soluble or partly soluble in the carrier and that assists in the charging process. Examples of such particle charging agents include metal salts such as lithium, cadmium, calcium, manganese and magnesium salts of heptanoic acid as well as zirconium, aluminium, cobalt and manganese salts of 2-ethyl hexanoic acid; fatty acids; lecithin; organic phosphorus compounds; succinimides; sulphosuccinates such as sodium dihexyl sulphosuccinate and sodium dioctyl sulphosuccinate, petroleum sulphonates and polar solvents such as alcohols, ketones and esters. Also the previously mentioned soluble polymers and resins that provide the particle dispersion and binder functions have been found to contribute to particle charging.

It is important that the quantity of said agents added to the formulation does not decrease the electrical resistivity of the ink beyond the limit of $10^8$ Ohm.cm. The action of such charge modification agents in the ink is not fully understood but it is believed that they assist in charging particles in the non-conductive carrier in the presence of a non-uniform electrostatic field of significant gradient, on or about the ejection point and thereby effecting discrete droplet ejection.

Another characteristic of said ink is to exhibit the correct rheology with respect to the operating parameters of the new ink jet device disclosed in the patent application Ser. No. 08/492,112.

A viscosity controller may also be added to the ink according to this invention. The viscosity controller may be selected from ethylene vinyl acetate copolymers, polybutadienes, polyisobutylenes or mixtures of these. For instance viscosity controllers such as Escorene and Vistanex manufactured by Exxon Chemicals may be incorporated into said ink.

The temperature of said ink contained within and/or ejected by the device described in U.S. Ser. No. 08/492,112 may be between 110° C. and 195° C.; the preferred temperature range is between 125° C. and 155° C. Under these operating conditions, the viscosity range of the ink, may be between 5 and 150 cps with 20 to 50 cps being preferred. It has been observed that if the viscosity of the ink is very high, ejection of droplets is erratic with poor resolution being exhibited. If the viscosity of said ink is very low then controlled ejection is not observed.

The ink according to the present invention is prepared by dispersing the said marking particles and other aforementioned components into a carrier. A variety of processes can be employed for the preparation of the ink including ball mills, aitritors, colloid mills, three-roll mills, pearl mills and high speed dispersers.

Examples of applications for the ink according to this invention are diverse and include office printers, component marking, magnetic ink character recognition, food stuffs marking, textile printing, the making of printing plates, application of pharmaceuticals and the marking of medications. It will be realized that the proposed end use will determine the selection of the various components.

EXAMPLES

This then generally describes the invention but to assist with understanding the invention reference will now be made to examples of ink formulations.

| Example 1 | |
|---|---|
| Paraffin wax | 81 g |
| Escorene UL 40028 | 9 g |
| 6% zirconium octoate | 5 g |
| Microlith Blue 4GT | 5 g |

This ink was used in the ink jet printing device described in PCT/AU94/00065 to image copy bond paper. The dot size was controlled from 5 to 100 micrometers by varying the applied voltage to the ejection point. Both the image quality and density were found to be very good with the print exhibiting sharp edge definition and minimal bleeding.

| Comparative Example 1 | |
|---|---|
| Paraffin wax | 81 g |
| Escorene UL 40028 | 9 g |
| Microlith Blue 4GT | 5 g |

This ink was also used in the ink jet printing device described in PCT/AU94/00065 to image copy bond paper. The dot size could not be controlled by the applied voltage to the ejection point. Although image density was acceptable, image quality was poor and in particular edge definition was diffuse.

| Example 2 | |
|---|---|
| Paraffin wax | 81 g |
| Escorene UL 40028 | 9 g |
| 6% zinc naphthenate | 5 g |
| Microlith Blue 4GT | 5 g |
| Example 3 | |
| Paraffin wax | 81 g |
| Escorene UL 40028 | 9 g |
| Aerosol OT | 5 g |
| Microlith Blue 4GT | 5 g |
| Example 4 | |
| Paraffin wax | 97.4 g |
| Irgalite Blue LGLD | 0.5 g |
| Araldite 6084 | 2.0 g |
| 6% zirconium octoate | 0.1 g |
| Example 5 | |
| Paraffin wax | 48 g |
| AC-6 | 48 g |
| Irgalite Blue LGLD | 3 g |
| 6% zirconium octoate | 1 g |

Example 6

| | |
|---|---|
| Paraffin wax | 79.8 g |
| Elvax 210 | 10.0 g |
| Irgalite Blue LGLD | 10.0 g |
| 6% zirconium octoate | 0.2 g |

Example 7

| | |
|---|---|
| Paraffin wax | 97 g |
| Irgalite Blue LGLD | 2 g |
| 6% zirconium octoate | 1 g |

Example 8

| | |
|---|---|
| Paraffin wax | 49.4 g |
| AC-6 | 49.4 g |
| Irgalite Blue LGLD | 1.0 g |
| 6% zirconium octoate | 0.2 g |

Example 9

| | |
|---|---|
| Paraffin wax | 88.0 g |
| Araldite 6084 | 8.0 g |
| Orasol red B | 2.0 g |
| 6% zirconium octoate | 2.0 g |

Example 10

| | |
|---|---|
| Synthawax | 95.0 g |
| Microlith blue 4GT | 2.5 g |
| 6% zirconium octoate | 2.5 g |

Example 11

| | |
|---|---|
| Polystyrene Dow PS2 | 57.0 g |
| Jayflex UDP | 38.0 g |
| Microlith blue 4GT | 2.5 g |
| 6% zirconium octoate | 2.5 g |

Example 12

| | |
|---|---|
| Piccolastic A50 | 95.0 g |
| Microlith blue 4GT | 2.5 g |
| 6% zirconium octoate | 2.5 g |

Example 13

| | |
|---|---|
| Paraffin wax | 95.0 g |
| Microlithgreen GT | 2.5 g |
| OLOA 1200 | 2.5 g |

Example 14

| | |
|---|---|
| Paraffin wax | 95.0 g |
| Tintacarb 300 | 2.5 g |
| Neutral calcium petronate | 2.5 g |

These inks were evaluated in the ink jet printing device described in U.S. Ser. No. 08/492,112 to image copy bond paper. With examples 2 to 14 the dot size could be controlled from 5 to 100 micrometers by varying the applied voltage to the ejection point. Both the image quality and density were found to be excellent and the prints exhibiting very sharp edge definition and minimal bleeding.

Paraffin wax is a hydrocarbon wax with a melting point of 65° C. and viscosity of 3.5 mPas at 130° C., product of Shell Chemical.

Synthwax is a hydrogenated castor oil made by J. Kitchen. UK.

Escorene UL 40028 is an ethylene vinyl acetate copolymer, product of Exxon Chemicals.

6% zirconium octoate is a solution of zirconium octoate in an aliphatic hydrocarbon containing 6% zirconium as metal, product of Hüls America.

Microlith Blue 4GT is a 40% by weight dispersion of phthalocyanine blue pigment in glycerol ester of rosin, product of Ciba Geigy, Switzerland.

Aerosol OT is sodium dioctyl sulphosuccinate, product of American Cycanamid Co., USA.

Irgalite Blue LGLD is a pigment blue 15:3 made by Ciba Geigy.

AC-6 is a polyethylene wax made by Allied signal.

Elvax 210 is an ethylene vinyl acetate resin made by Du Pont.

Araldite 6084 is an epoxy resin made by Ciba Geigy.

Tintacarb 300 is a furnace carbon black made by Cabot Australasia.

Aerosol OT is sodium dioctyl sulphosuccinate, product of American Cycanamid Co., USA.

OLOA 1200 is an alkyl bis succinimide made by Chevron Chemicals, USA.

Neutral calcium petronate is a calcium petroleum sulphonate made by Witco Corp. USA.

Dow PS2 is a polystyrene polymer made by Dow Chemical, USA.

Piccolastic A50 is a polystyrene polymer made by Hercules Inc., USA.

Jayflex UDP is undecyl dodecyl phthalate, made by Exxon Chemicals, USA.

It will be seen that by this invention there is produced an ink which is distinctly different from other inks and which is particularly useful for novel ink jet applications.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

We claim:

1. A solid ink jet composition comprising a carrier having an electrical resistivity of at least $10^8$ Ohm.cm, insoluble marking particles and a particle charging agent dispersed therein, wherein said marking particles are capable of being agglomerated and ejected from the bulk ink as discrete droplets in the presence of an electrostatic field when the viscosity of the ink is reduced.

2. A solid ink jet ink composition as in claim 1, wherein the reduction in viscosity is done by heating and subsequent melting of the ink.

3. A solid ink jet ink composition as in claim 1, wherein the marking particle is a pigment, an insoluble dyestuff, a polymer or mixture thereof.

4. A solid ink jet ink composition as in claim 1, wherein the particle charging agent is a metal soap, a fatty acid, lecithin, an organic phosphorus compound, a succinimide, a sulphosuccinate, petroleum sulphonates or a mixture thereof.

5. A solid ink jet ink composition as in claim 1, wherein the particle charging agent is a soluble or partially soluble resin such as a modified rosin ester, an acrylic, a vinyl, a hydrocarbon or a mixture thereof.

6. A solid ink jet ink composition as in claim 1 further including a viscosity controller wherein the viscosity controller is selected from the group comprising ethylene vinyl acetate copolymers, polybutadienes, polyisobutylenes or mixtures of thereof.

7. A solid ink jet ink composition as in claim 1 wherein the carrier comprises a low melting point wax or resin.

8. A solid ink jet ink composition as in claim 7 wherein the wax or resin is selected from low molecular weight polyethylene, hydrogenated castor oil, ester wax, paraffin wax, rosins, and ethylene vinyl acetate copolymers or mixtures thereof.

9. A printing plate comprising a solid ink jet composition as in claim 1 on a substrate.

10. A solid ink jet composition as in claim 1 where the viscosity of the ink is reduced when the composition is heated to 155° C.

11. A solid ink jet ink composition as in claim 10 where the ink has a viscosity in the range of 5 to 150 cps when heated to 155° C.

12. A solid ink jet composition comprising a carrier having an electrical resistivity of at least $10^8$ Ohm.cm, insoluble marking particles and a particle charging agent, wherein the ink has a viscosity in the range of 5 to 150 cps at 155° C. and the particle charging agent is selected from the group consisting of metal soaps, fatty acids, lecithin, organic phosphorous compounds, succinimides, sulphosuccinates, petroleum sulphonates, soluble or partially soluble resins, and mixtures thereof.

13. A solid ink jet composition comprising a carrier having an electrical resistivity of at least $10^8$ Ohm.cm, insoluble marking particles and a particle charging agent, wherein the ink is capable of being heated to 135° C. and has a viscosity in the range of 20 to 50 cps at that temperature and the particle charging agent is selected from the group consisting of metal soaps, fatty acids, lecithin, organic phosphorous compounds, succinimides, sulphosuccinates, petroleum sulphonates, soluble or partially soluble resins, and mixtures thereof.

14. A solid ink jet ink comprising;
  (a) 80 to 98.9% of a carrier having an electrical resistivity of at least $10^8$ Ohm.cm and which is solid at room temperature and which has a viscosity in the range of 5 to 150 cps at 155° C.,
  (b) 1 to 10% of insoluble marking particles, and
  (c) 0.1 to 5% of a particle charging agent.

15. A solid ink jet ink comprising;
  (a) 80 to 98.9% of a carrier which is solid at room temperature and which has a viscosity in the range of 5 to 150 cps at 155° C.,
  (b) 1 to 10% of insoluble marking particles, and
  (c) 0.1 to 5% of a particle charging agent, the resultant ink having an electrical resistivity of at least $10^8$ Ohm.cm.

16. A solid ink jet composition as in claim 12 wherein said resins are selected from the group consisting of modified resin esters, acrylic esters, vinyl esters, and mixtures thereof.

17. A solid ink jet composition as in claim 13 wherein said resins are selected from the group consisting of modified resin esters, acrylic esters, vinyl esters, and mixtures thereof.

18. A solid ink jet composition as in claim 1 wherein the ink has a viscosity of from 5 to 150 cps at a temperature of from 110° C. to 195° C.

19. A solid ink jet composition as in claim 18 wherein the ink has a viscosity of from 5 to 150 cps at a temperature of from 125° C. to 155° C.

* * * * *